(12) United States Patent
Kim et al.

(10) Patent No.: US 8,919,683 B2
(45) Date of Patent: Dec. 30, 2014

(54) SHREDDER FOR SUPER ADSORBENT POLYMER AND PREPARATION METHOD OF SUPER ABSORBENT POLYMER USING THE SAME

(75) Inventors: Gi-Cheul Kim, Daejeon (KR); Chang-Sun Han, Daejeon (KR); Sang-Gi Lee, Daejeon (KR); Kyu-Pal Kim, Daejeon (KR); Sung-Soo Park, Seoul (KR); Jin-Hyun Bae, Daegu (KR); Tae-Young Won, Daejeon (KR); Gyu Leem, Daejeon (KR)

(73) Assignee: LG Chem, Ltd., Seoul (KR)

( * ) Notice: Subject to any disclaimer, the term of this patent is extended or adjusted under 35 U.S.C. 154(b) by 418 days.

(21) Appl. No.: 13/117,775

(22) Filed: May 27, 2011

(65) Prior Publication Data
US 2011/0290920 A1 Dec. 1, 2011

(30) Foreign Application Priority Data
May 28, 2010 (KR) .................. 10-2010-0050638

(51) Int. Cl.
- *B02C 18/16* (2006.01)
- *B26D 1/38* (2006.01)
- *B02C 18/18* (2006.01)
- *B02C 23/24* (2006.01)
- *B02C 18/14* (2006.01)

(52) U.S. Cl.
CPC ............. *B02C 18/145* (2013.01); *B26D 1/38* (2013.01); *B02C 18/18* (2013.01); *B02C 2018/188* (2013.01); *B02C 23/24* (2013.01); *B02C 18/148* (2013.01); *B26D 1/385* (2013.01)
USPC ................................... 241/243; 241/294

(58) Field of Classification Search
USPC ................................ 241/243, 242, 57
See application file for complete search history.

(56) References Cited

U.S. PATENT DOCUMENTS

| | | | | |
|---|---|---|---|---|
| 3,353,754 | A * | 11/1967 | Heijnis et al. | 241/30 |
| 6,305,623 | B1 * | 10/2001 | Sotsky et al. | 241/73 |
| 6,422,495 | B1 | 7/2002 | De Boef et al. | |
| 6,837,453 | B2 * | 1/2005 | Sturm | 241/243 |
| 7,213,778 | B2 * | 5/2007 | Astafan et al. | 241/73 |
| 7,434,756 | B2 * | 10/2008 | Sotsky | 241/283 |
| 7,757,988 | B2 * | 7/2010 | Pallmann et al. | 241/243 |
| 7,900,859 | B2 * | 3/2011 | Carpenter | 241/243 |
| 2004/0118958 | A1 * | 6/2004 | Sturm | 241/243 |

FOREIGN PATENT DOCUMENTS

| | | |
|---|---|---|
| CN | 1206365 | 1/1999 |
| DE | 19518645 C1 | 9/1996 |
| EP | 1510317 A1 | 3/2005 |
| JP | S6434451 A | 2/1989 |
| JP | 11292919 A | 10/1999 |

(Continued)

*Primary Examiner* — Faye Francis
(74) *Attorney, Agent, or Firm* — McKenna Long & Aldridge LLP (57) ABSTRACT

A shredder for super absorbent polymer includes an inlet portion for feeding a plate-shaped super absorbent polymer, a pulverizing portion for pulverizing the super absorbent polymer fed through the inlet portion, and an outlet portion for discharging the pulverized super absorbent polymer from the pulverizing portion. The pulverizing portion includes a rotary drum to which a plurality of rotary blades are attached, at least one fixed blade for pulverizing the super absorbent polymer in cooperation with the plural rotary blades, and a housing for holding the rotary drum and the at least one fixed blade. Each rotary blade has a polygon shape with at least one vertex having an acute angle of at most 45°.

12 Claims, 11 Drawing Sheets

(56) References Cited

FOREIGN PATENT DOCUMENTS

| JP | 2001259456 A | 9/2001 |
|----|--------------|--------|
| JP | 2001347180 A | 12/2001 |
| JP | 2002011439 A | 1/2002 |
| JP | 2002121291 A | 4/2002 |
| JP | 2002177807 A | 6/2002 |
| JP | 2003260378 A | 9/2003 |
| JP | 2008036526 A | 2/2008 |

* cited by examiner

SHREDDER FOR SUPER ADSORBENT POLYMER AND PREPARATION METHOD OF SUPER ABSORBENT POLYMER USING THE SAME

This application claims the priority to Korean Application 10-2010-0050638, filed on May 28, 2010, which is incorporated by reference herein in its entirety.

TECHNICAL FIELD

The present invention relates to a shredder for super absorbent polymer and a preparation method for super absorbent polymer using the same.

BACKGROUND OF ART

Super absorbent polymers (SAPs) are polymers that are capable of absorbing a large amount of water about five hundred to one thousand times the mass of their own. The SAPs are called by different names according to the developers, such as, for example, super absorbency material (SAM) or absorbent gel material (AGM). Commercial productions of SAP began for use in feminine hygiene napkins, and the use of SAP can be found in a very wide range of applications, including water combination soils for gardening, water-stop materials for engineering and construction, sheets for raising seeding, freshness-keeping agents in the food distribution field, and materials for sweating rooms, as well as personal hygiene products, such as disposable baby diapers.

The known preparation methods for SAP include an inverse suspension polymerization method or an aqueous solution polymerization method. The method using inverse suspension polymerization is disclosed in, for example, JP S-56-161408, JP S-57-158209 and JP S-57-198714. The method using aqueous solution polymerization includes several methods: a thermal polymerization method characterized by polymerization of a hydrated gel polymer during shearing and freezing, and a photo-polymerization method using UV radiations on a high-concentration aqueous solution on a conveyer belt to perform both polymerization and drying at once.

The hydrated gel polymer obtained from the polymerization reaction is subjected to drying and pulverization, and then becomes commercially available as a powder product. In order to efficiently accomplish the drying step, it is of a great importance to increase the surface area of the hydrated gel polymer as possible. To increase the surface area of the hydrated gel polymer prior to the drying process, a method can be taken into consideration that involves simply pulverizing the hydrated gel polymer prepared by thermal polymerization or photo-polymerization. In this regard, there is disclosed a process of performing a primary pulverization of a hydrated gel polymer after polymerization in order to increase the surface area of the hydrated gel polymer. But, the pulverization process inevitably renders the hydrated gel polymer sticking to the inner walls, shear blades or shear shafts of shredder equipment, which hinders the pulverization process with inefficiency.

The conventional pulverizing process, for example, has involved cutting a plate-shaped super absorbent polymer obtained as a primary product into long strips and then chopping the polymer stripes into crumbs. But, the super absorbent polymer is likely to stick to the shear blades or the shear shafts while being cut into strips, which results in inefficiency of the pulverization process. Due to the stickiness, even the nicely cut stripes of the super absorbent polymer are hard to cut into smaller crumbs with uniform size.

This precludes efficiency of the primary pulverization process of the super absorbent polymer. Such an inefficient pulverization results in a failure of the subsequent drying process and consequently a deterioration in the general properties of the final super absorbent polymer product.

SUMMARY OF THE INVENTION

Accordingly, the present invention provides a shredder for super absorbent polymer that not only effectively performs a primary pulverization of a super absorbent polymer with a high moisture content and stickiness to enable preparation of a super absorbent polymer with good properties, but also simplifies the pulverization process with efficiency to enhance productivity.

Further, the present invention provides a preparation method for super absorbent polymer that uses the shredder for super absorbent polymer to efficiently prepare a super absorbent polymer with good properties.

The present invention provides a shredder for super absorbent polymer that includes: an inlet portion for feeding a plate-shaped super absorbent polymer; a pulverizing portion for pulverizing the super absorbent polymer fed through the inlet portion; and an outlet portion for discharging the pulverized super absorbent polymer from the pulverizing portion. The pulverizing portion comprises: a rotary drum to which a plurality of rotary blades are attached; at least fixed blade for pulverizing the super absorbent polymer in cooperation with the plural rotary blades; and a housing for holding the rotary drum and the at least one fixed blade. Each rotary blade has a shape of polygon with at least one vertex having an acute angle of at most 45°.

The rotary drum has rotary blade mounting grooves arranged in circumferential direction. The rotary blades are rested in the mounting grooves to expose at least one vertex thereof lifted to have an acute angle of at most 45° on the drum.

To the rotary blade mounting groove is fixed a rotary blade mounting jig, and the rotary blade is fixedly bolted to the rotary blade mounting jig.

The rotary blade has a plurality of vertices of the polygonal shape lifted to have an acute angle of at most 45°.

The rotary blade has a concave face in the direction of lifting the at least one vertex, and the concave face has edges with an acute angle. Each edge of the face in the direction of lifting the at least one vertex connects the respective vertices of the polygonal shape in the form of a curved line.

The plural rotary blades are arranged in the form of at least one spiral on the rotary drum.

The plural rotary blades are linearly arranged in at least one row in the axial direction of the rotary drum.

The at least one fixed blade has a plurality of sawteeth.

The at least one fixed blade is provided as a plurality of fixed blades.

The at least one fixed blade is provided as a plurality of fixed blades arranged in the rotation direction of the rotary drum.

The shredder for super absorbent polymer further comprises: a blower for blowing air of a predetermined temperature into the pulverizing portion; and an outlet passage for discharging the air from the pulverizing portion.

The shredder for super absorbent polymer further comprises a meat chopper for further pulverizing the super absorbent polymer discharged from the outlet portion.

The shredder for super absorbent polymer further comprises a release agent supplying means for supplying water or a release agent for the super absorbent polymer pulverized from the pulverizing portion.

The present invention is also to provide a method for preparing a super absorbent polymer that comprises: preparing a monomer composition comprising an aqueous ethylene-based unsaturated monomer, and a polymerization initiator; supplying the monomer composition to a polymerization reactor comprising a conveyer belt and applying UV radiation or heat onto the supplied monomer composition on the conveyer belt to prepare a plate-shaped super absorbent polymer; supplying the polymerized plate-shaped super absorbent polymer to the shredder for super absorbent polymer according to any one of the claims 1 to 12 to perform a primary pulverization; drying the pulverized super absorbent polymer; and performing a secondary pulverization for the dried super absorbent polymer.

Advantageous Effects

The shredder for super absorbent polymer according to the present invention is capable of more effectively pulverizing a highly sticky super absorbent polymer, thereby securing the subsequent drying process of the super absorbent polymer with more efficiency. Accordingly, the shredder for super absorbent polymer can be used in preparing a super absorbent polymer through primary pulverization, drying, and secondary pulverization, as a result of which the super absorbent polymer exhibits more enhanced properties, such as higher water retention capacity, and enhanced productivity.

Besides, the preparation method for super absorbent polymer according to the present invention not only enhances the efficiency of the pulverization process to increase the whole efficiency of the preparation process for super absorbent polymer but also raises the efficiency of the drying process subsequent to the pulverization process. The super absorbent polymer powder thus obtained by the preparation method exhibits excellent properties such as high water retention capacity.

BRIEF DESCRIPTION OF THE DRAWINGS

FIG. 5(a) is a perspective view; FIG. 5(b) is a cross-section along the line of b-b; and FIG. 5(c) is a cross-section along the line of c-c.

DETAILED DESCRIPTION OF THE EMBODIMENTS

Hereinafter, a detailed description will be given as to a shredder for super absorbent polymer and a preparation method for super absorbent polymer using the same in accordance with the exemplary embodiments of the present invention.

If not specified otherwise, the term "plate-shaped super absorbent polymer" as used herein is defined as follows.

The term "plate-shaped super absorbent polymer" as used herein refers to a hydrated gel polymer polymerized in the plate form for preparation of a super absorbent polymer, which can be prepared by polymerization in a polymerization reactor comprising a flat polymerizing portion, such as, for example, a conveyer belt. Here, the plate-shaped super absorbent polymer includes a "plate"- or "sheet"-shaped hydrated gel polymer having a predetermined thickness. Such a plate-shaped super absorbent polymer includes a plate- or sheet-shaped hydrated gel polymer that is acquired directly from polymerization in a polymerization reactor or subjected to a drying process prior to a primary pulverizing process. The moisture content of the super absorbent polymer is not specifically limited.

Figure 1:
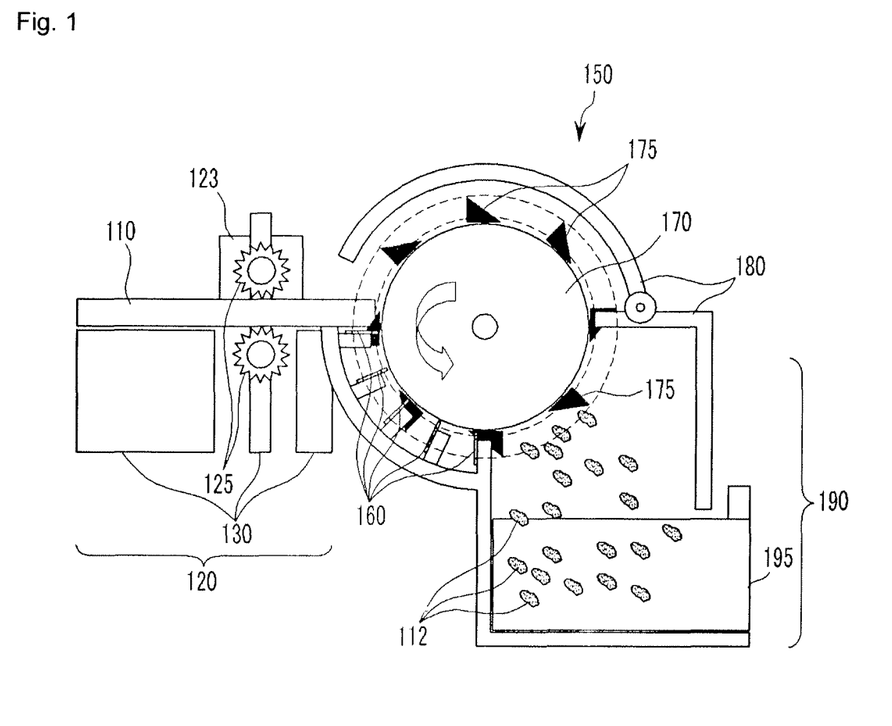
FIG. 1 is a cross-section of a shredder for super absorbent polymer according to an embodiment of the present invention.

FIG. 1 is a cross-section of a shredder for super absorbent polymer according to an embodiment of the present invention.

As shown in FIG. 1, the shredder for super absorbent polymer according to an embodiment of the present invention comprises: an inlet portion 120 through which a plate-shaped super absorbent polymer 110 is fed; a pulverizing portion 150 for pulverizing the super absorbent polymer 110 fed through the inlet portion 120; and an outlet portion 190 for discharging the pulverized super absorbent polymer 110 from the pulverizing portion 150.

In the inlet portion 120, feed rollers 125 for guiding an input of the plate-shaped super absorbent polymer 110 are mounted on a table 130 and rotated at a predetermined rate. Hence, the plate-shaped super absorbent polymer 110 is fed at a predetermined rate by the feed rollers 125.

The pulverizing portion 150 comprises: a rotary drum 170 having a plurality of rotary blades 175 attached on; at least one fixed blade 160 for pulverizing the plate-shaped super absorbent polymer 110 in cooperation with the plural rotary blades 175; and a housing 180 for holding the rotary drum 170 and the at least one fixed blade 160.

The outlet portion 190 comprises a container 195 for collecting super absorbent polymer crumbs 112 pulverized in the pulverizing portion 150 and discharged from the housing 180. With accumulation of the polymer crumbs 112, the container 195 is pulled out to discard the polymer crumbs 112 for after-treatment.

Figure 2:
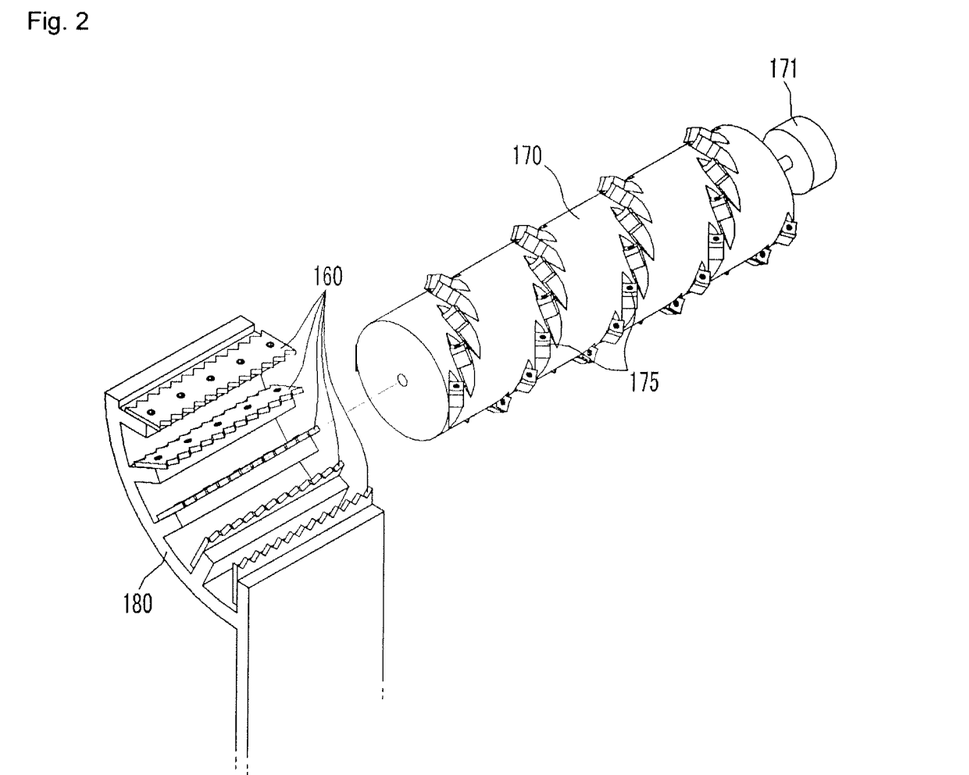
FIG. 2 is an exploded perspective of a pulverizing portion 150 according to an embodiment of the present invention.

FIG. 2 is an exploded perspective of the pulverizing portion 150 according to an embodiment of the present invention.

As shown in FIGS. 1 and 2, a plurality of fixed blades 160 are mounted in the housing 180 on the side of the inlet portion 120 through which the super absorbent polymer 110 is fed. The plural fixed blades 160 are built at a predetermined angle in the rotation direction of the rotary drum 170.

A plurality of rotary blades 175 are mounted on the rotary drum 170. As the rotary drum 170 rotates, the fixed blades 160 and the rotary blades 175 skim over each other to break the incoming super absorbent polymer 110 into crumbs 112.

Figure 3:
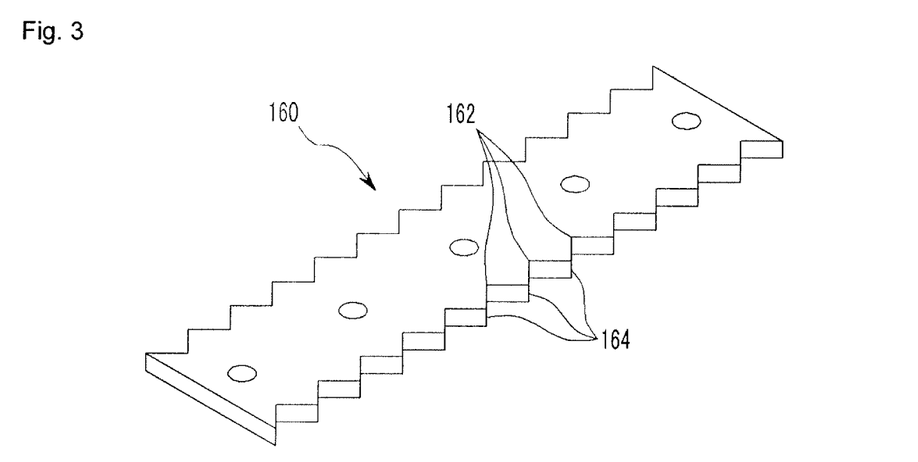
FIG. 3 is a perspective of a fixed blade according to an embodiment of the present invention.

FIG. 3 is a perspective of the fixed blade according to an embodiment of the present invention.

As shown in FIG. 3, each fixed blade 160 has a plurality of sawteeth that form crests 164 and notches 162. In other words, the fixed blade 160 has a plurality of sawteeth in correspondence to the arrangement of the plural rotary blades 175 mounted on the rotary drum 170. The sawteeth of the fixed blade 160 are provided on both edges of the fixed blade 160 that are opposite to each other. In this manner, when the sawteeth on the one side edge of the fixed blade 160 get blunt, the fixed blade 160 can be detached from the housing 180 and remounted upside down in the housing 160 to make the sawteeth on the other side edge used.

The feed rollers 125 are rotated by a motor 123, and the rotary drum 170 by a motor 171. The motors 123 and 171 used to drive the feed rollers 125 and the rotary drum 170 may be provided as separate motors.

The rotation rates of the feed rollers 125 and the rotary drum 170 may be determined by those skilled in the art in consideration of the conditions (e.g., dryness, thickness, etc.) of the plate-shaped super absorbent polymer 110 to be pulverized, the intervals between adjacent sawteeth of the fixed blade 160, the standard (e.g., size, arrangement, etc.) of the rotary blades 175 on the drum, or the like.

Figure 4:
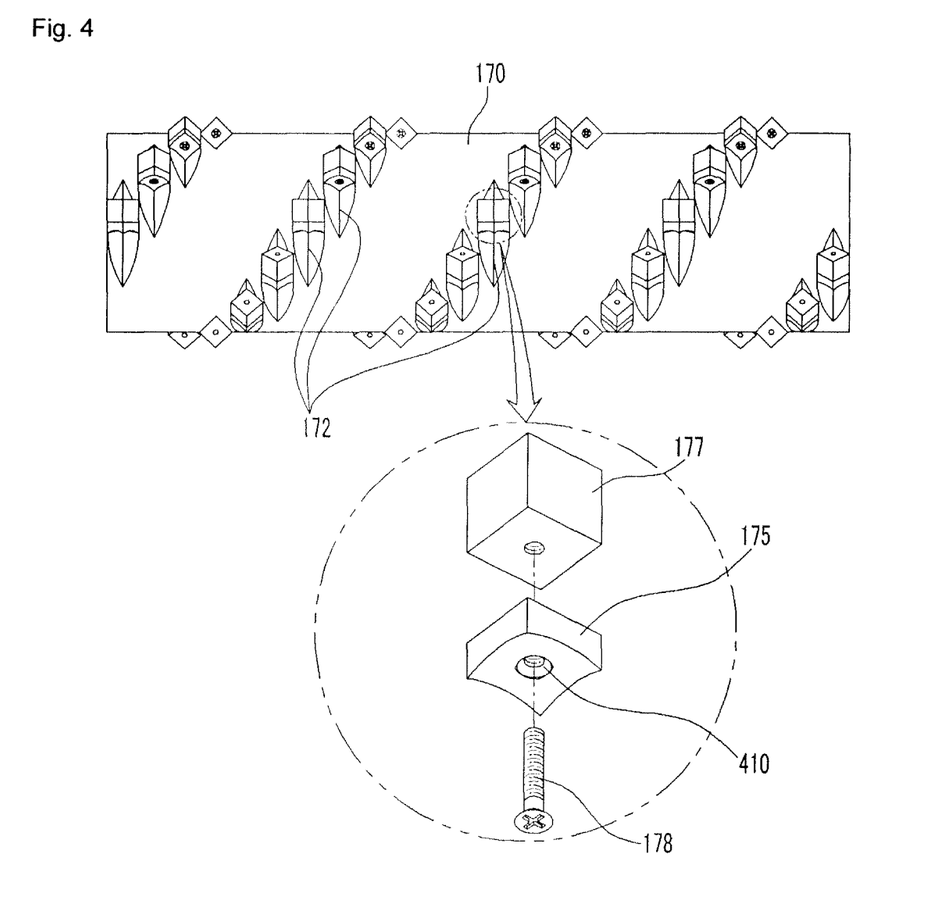
FIG. 4 is an illustration showing an arrangement embodiment and a setup embodiment of rotary blades 175 on a rotary drum 170.

FIG. 4 is an illustration showing an arrangement embodiment and a setup embodiment of the rotary blades 175 on the rotary drum 170.

Figure 5:
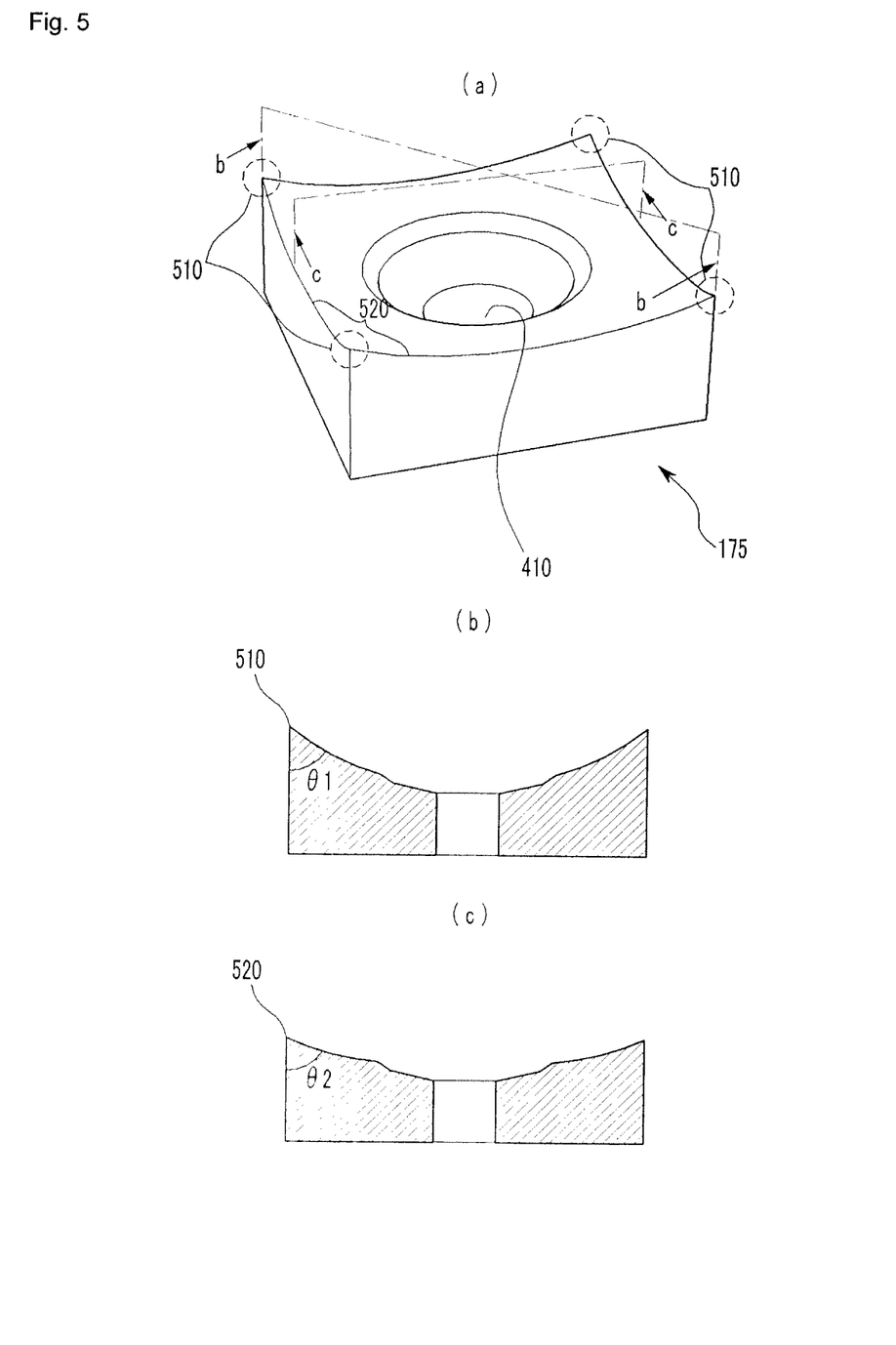
FIG. 5 presents enlarged views showing the detailed shape of the rotary blade 175.

FIG. 5 presents enlarged views showing the detailed shape of the rotary blade 175: FIG. 5(*a*) is a perspective view; FIG. 5(*b*) is a cross-section along the line of b-b; and FIG. 5(*c*) is a cross-section along the line of c-c.

Figure 6:
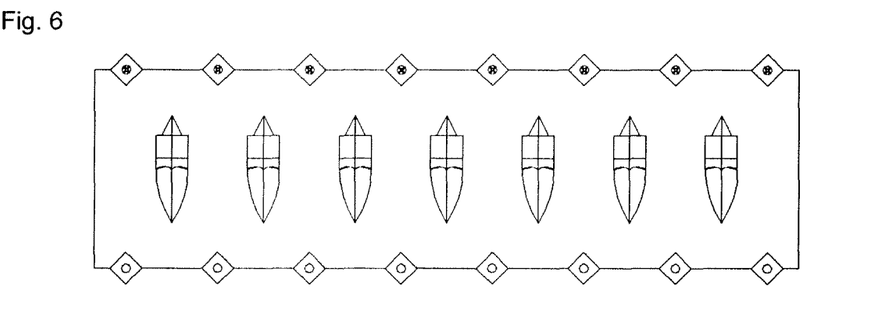
FIG. 6 is an illustration showing another arrangement embodiment of the rotary blades 175 on the rotary drum 170.

FIG. 6 is an illustration showing another arrangement embodiment of the rotary blades 175 on the rotary drum 170.

As shown in FIG. 4, the rotary blades 175 are arranged in the form of at least one spiral on the rotary drum 170. FIG. 4 shows the rotary blades 175 arranged in two spirals, which arrangement is not to limit the scope of the present invention. It is obvious to those skilled in the art that, if spatially allowed, the rotary blades 175 can also be arranged in at least three spirals on the surface of the rotary drum 170.

As shown in FIG. 6, the rotary blades 175 may also be linearly arranged in at least one row in the axial direction of the rotary drum 170. FIG. 6 shows a first row of rotary blades 175 on the top side of the rotary drum 170, a second row of rotary blades 175 on the bottom side, and a third row of rotary blades 175 on the front side. If not shown in the figure, a row of rotary blades 175 may also be arranged on the back side of the rotary drum 170 as symmetrical to the row of rotary blades 175 on the front side of the drum 170.

Referring to FIG. 4, rotary blade mounting grooves 172 are formed on the rotary drum 170 in a circumferential direction of the rotary drum 170, and the rotary blades 175 are mounted on the rotary blade mounting grooves 172. More specifically, a rotary blade mounting jig 177 is fixed to each rotary blade mounting groove 172, with each rotary blade 175 having a bolt hole 410, so the rotary blade 175 can be fastened to the rotary blade mounting jig 177 through a bolt 178.

The rotary blade mounting groove 172 can be easily formed by cutting the surface of the rotary drum 170 along the circumference. The rotary blade mounting jig 177 may be fixed to the mounting groove 172 by various methods. For example, the rotary blade mounting jig 177 is welded to the rotary blade mounting groove 172; or the rotary blade mounting jig 177 with a bolt hole is fixedly bolted to the mounting groove 172.

As the rotary blade 175 is fixed to the rotary blade mounting jig 177 through a bolt coupling, it is easier to replace or repair the rotary blade 175.

Referring to FIGS. 4 and 5, both the rotary blade 175 and the mounting jig 177 according to an embodiment of the present invention have a polygonal shape, such as, for example, a rectangle, so they can be easily rested into the mounting grooves 172 which are cut in the rotary drum 170 in the circumferential direction of the rotary drum 170.

Referring to FIG. 5, each rotary blade 175 according to an embodiment of the present invention has at least one or two of its vertices 510 lifted at an acute angle ($\theta 1$) of at most 45°. In other words, as shown in the cross-section of FIG. 5(*b*), at least one of the vertices 510 of the rotary blade 175 forms an acute angle ($\theta 1$) of at most 45° with the perpendicular line.

As the vertices 510 of the rotary blade 175 are lifted at an acute angle ($\theta 1$) of at most 45°, the rotary blade 175 works in cooperation with the fixed blade 160 in such a manner that the acutely lifted vertices 510 of the rotary blade 175 thrust down the super absorbent polymer in the notches of the fixed blade 160, causing the rotary blade 175 to tear off the super absorbent polymer. In other words, unlike scissors that cut a target object from the outer edge, the rotary blade 175 is operated to tear off a partly receded inner part from the end of the fed super absorbent polymer. Such a function of the rotary blade 175 makes it easier to pulverize the plate-shaped super absorbent polymer into small crumbs, because the super absorbent polymer is a soft and sticky absorbent material rather than a hard one.

As demonstrated in the following examples, according to the results of the experiments carried out by the inventors of the present invention, the vertices 510 lifted at an acute angle of at most 45°, for example, 10 to 45°, preferably 20 to 40° enable the rotary blade 175 to cut off the super absorbent polymer more effectively, thereby securing more efficiency in a primary pulverization process of the super absorbent polymer carried out prior to drying. This primary pulverization process subjects the super absorbent polymer torn off into far smaller crumbs, thereby increasing the surface area of the pulverized super absorbent polymer, making the subsequent drying process carried out more effectively even at a low temperature, and much more enhancing the properties (e.g., water retention capacity) of the final super absorbent polymer product obtained through the drying and secondary pulverization steps.

In consideration of the above function of the rotary blade 175, the rotary blade 175 may be rested in the mounting groove 172 in such a way that at least one of the vertices as designed to tear off the super absorbent polymer, that is, lifted to have an acute angle of at most 45° is exposed on the rotary drum 170.

Referring to FIGS. 5(*a*) and 5(*c*), the rotary blade 175 according to an embodiment of the present invention may be constructed to have one concave face formed in the direction of lifting the at least one vertex, that is, facing the plate-shaped super absorbent polymer when using the shredder, the concave face having edges 520 with an acute angle ($\theta 2$). Also, each edge of the face formed in the direction of lifting the at least one vertex may concavely connect the respective vertices 510 of the polygon in the form of a curved line. Due to this construction of the rotary blade 175, the plate-shaped super absorbent polymer cut by the acutely lifted vertices 510 of the rotary blade 175 can also be cut through the edges 520 in the manner of scissors and thereby effectively torn off into small crumbs.

The rotary blade 175 in the embodiment of the present invention may be constructed so that each of the plural vertices on the face opposing the plate-shaped super absorbent polymer, such as four vertices 510 of a rectangular face, is lifted to form an acute angle of at most 45°. Accordingly, when any one of the vertices 510 gets blunt or needs to be repaired for any reason, the bolt 178 is released to allow a little turn of the rotary blade 175, and tightened to fasten the rotary blade 175 again, making another vertex 510 available. In this manner, the individual vertices 510 of the polygon-shaped rotary blade 175 can be put into use.

FIGS. 7 to 11 are explanatory illustrations showing a process of pulverizing a plate-shaped super absorbent polymer in the shredder for super absorbent polymer according to an embodiment of the present invention.

Figure 7:
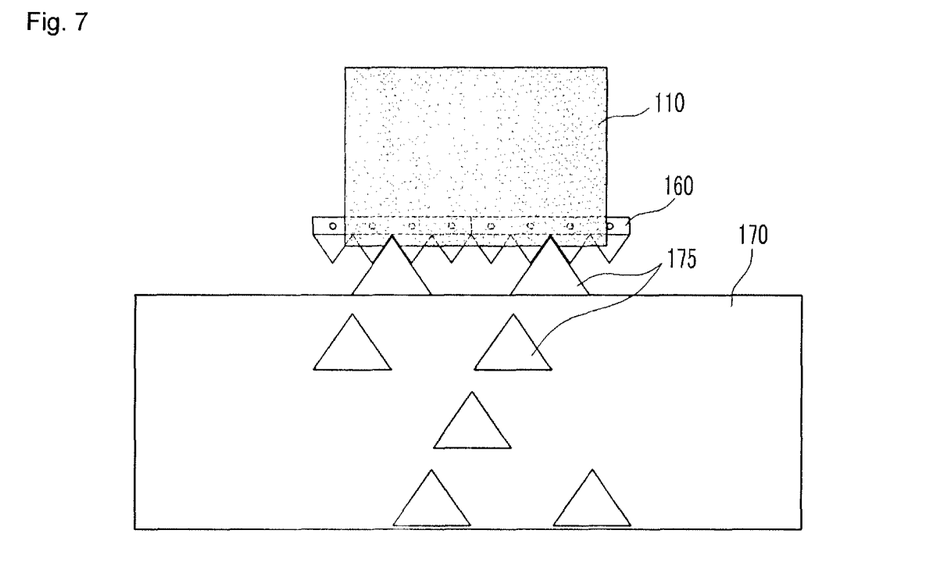
FIGS. 7 to 11 are explanatory illustrations showing the process of pulverizing a super absorbent polymer in a shredder for super absorbent polymer according to an embodiment of the present invention.

Referring to FIG. 7, while the rotary drum 170 with built-in rotary blades 175 is rotating, the rollers 125 feed the super absorbent polymer 110, and a specified portion of the super absorbent polymer 110 starts to be cut by a specific one of the rotary blades 175.

Figure 8:
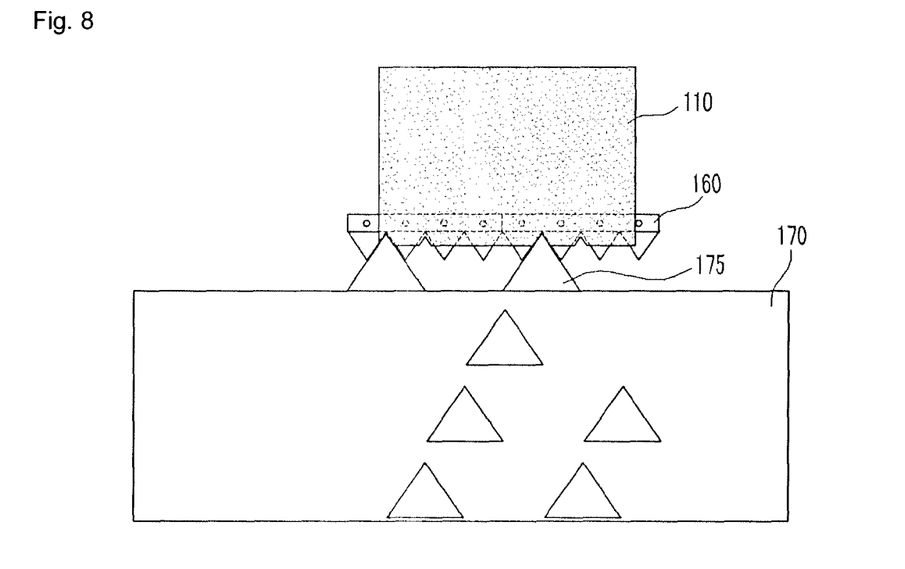

Referring to FIG. 8, as the motor 171 drives the rotary drum 170 to rotate, turning the next rotary blade 175 to oppose the fixed blade 160, the plate-shaped super absorbent polymer 110 precedes by a predetermined distance, and the next rotary blade 175 pulverizes the incoming plate-shaped super absorbent polymer 110 at a position adjacent to the cutting position of the previous rotary blade 175.

Figure 9:
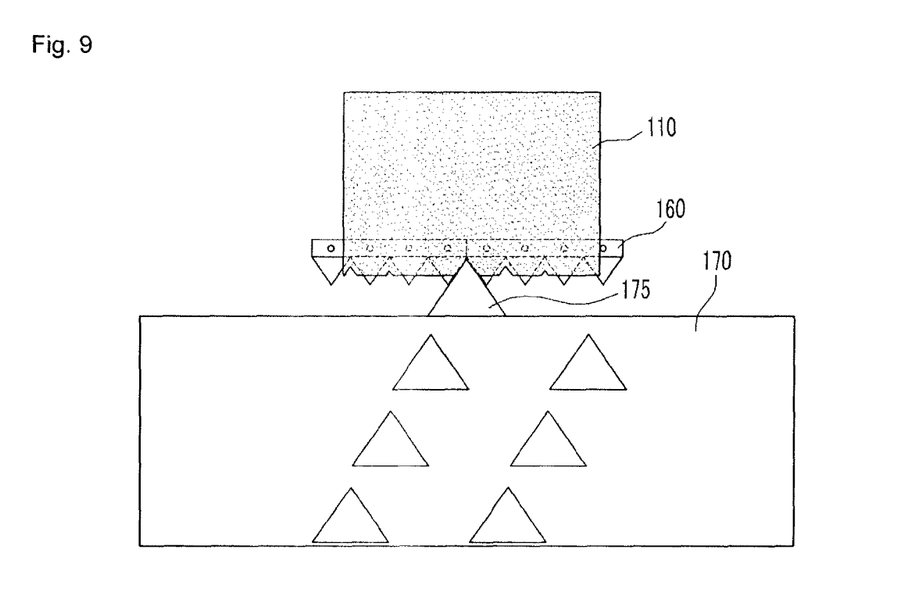
Figure 10:
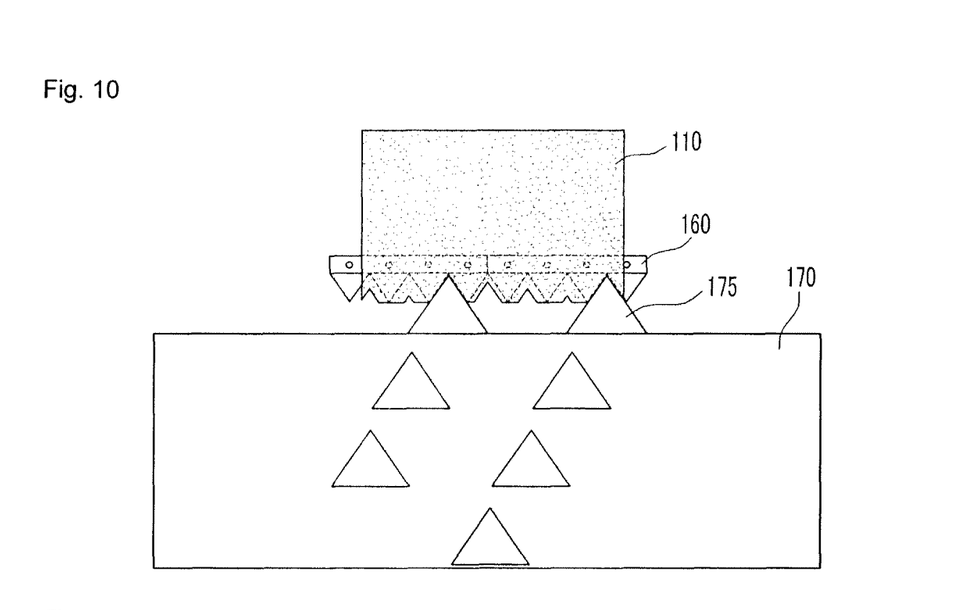

Referring to FIGS. 9 and 10, as the rotary drum 170 rotates, the next rotary blade 175 comes to pulverize the incoming plate-shaped super absorbent polymer 110 at an adjacent position.

Figure 11:
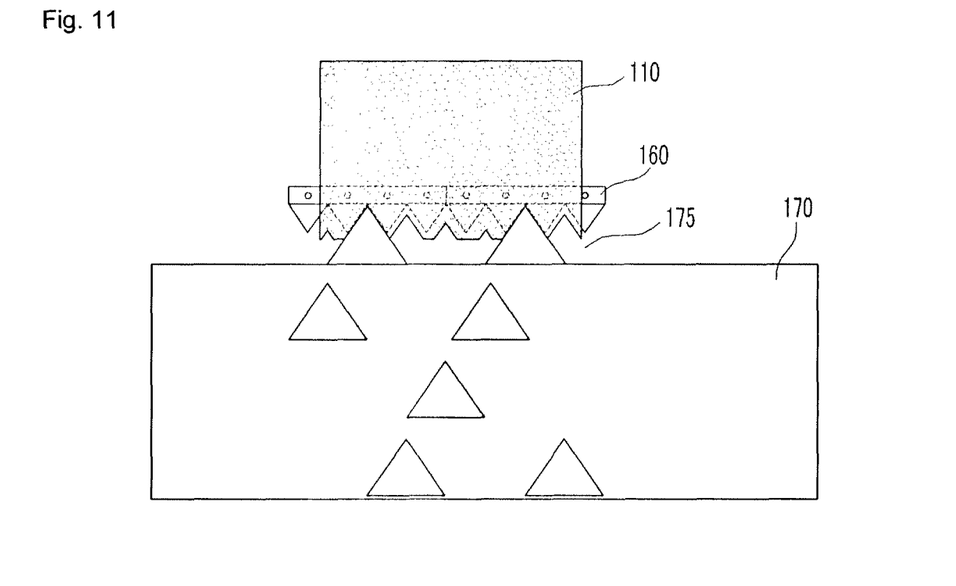

FIG. 11 shows that such a pulverization process continues after one turn of the rotary drum 170. In other words, the rotary blade 175 operated in FIG. 7 comes to operate again to tear off the plate-shaped super absorbent polymer 110 by a preceding length during one turn of the rotary drum 170.

The pulverization process described with reference to FIGS. 7 to 11 is continuously repeated, so the rotary blades 175 at different positions repeat the process of partly pulverizing the plate-shaped super absorbent polymer 110 into small crumbs 112, which are then discharged.

But, the pulverized plate-shaped super absorbent polymer 110 is an absorbent and sticky material, as previously mentioned, and thus cannot be completely cut into individual pieces by a single rotary blade 175 during the pulverization process. Instead, the pulverized super absorbent polymer 110 tends to stick to another portion of the plate-shaped super absorbent polymer around it and may be cut into large crumbs.

In consideration of this situation, the embodiment of the present invention provides, as previously described, a plurality of fixed blades 160 arranged in the housing 180 (see FIG. 1). Referring to FIG. 1, even when the super absorbent polymer 110 is not sufficiently cut by the uppermost fixed blade 160, the lower fixed blade 160 and the rotary blades 175 can pulverize the super absorbent polymer 110 into small crumbs. Likewise, with an arrangement of the plural fixed blades, the crumbs of the plate-shaped super absorbent polymer 110 pulverized by the fixed blades 160 and the rotary blades 175 can be cut into more uniform crumbs.

Figure 12:
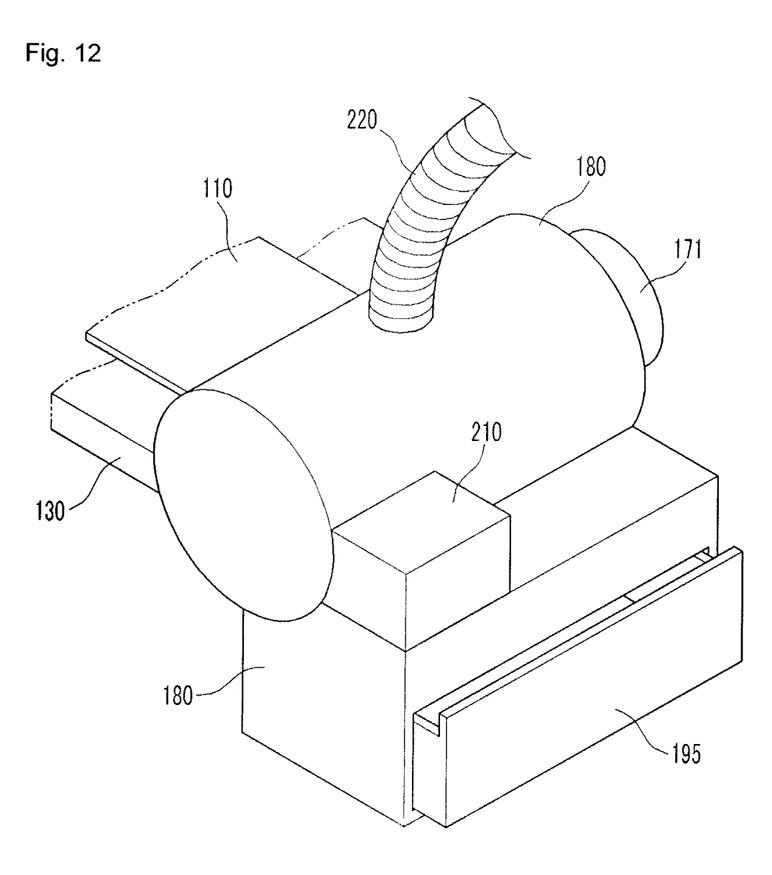
FIG. 12 shows a shredder for super absorbent polymer according to an embodiment of the present invention that further comprises a blower for blowing air of a predetermined temperature into a pulverizing portion; and an outlet passage for discharging the air from the pulverizing portion.

FIG. 12 is an illustration of a shredder for super absorbent polymer according to an embodiment of the present invention, in which the shredder further comprises: a blower 210 for blowing air of a predetermined temperature into the pulverizing portion; and an outlet passage 220 for discharging the air from the pulverizing portion.

The shredder for super absorbent polymer according to an embodiment of the present invention blows air of a predetermined temperature into the pulverizing portion 150 through the blower 210 and discharges the air from the pulverizing portion 150, thereby maintaining the fed super absorbent polymer at proper temperature and humidity levels.

As previously described, the plate-shaped super absorbent polymer to be pulverized contains moisture and has stickiness. Such a plate-shaped absorbent polymer has the cutting efficiency varied depending on its temperature and humidity during the cutting step.

Accordingly, the blower 210 and the outlet passage 220 are used to maintain the temperature and humidity of the plate-shaped super absorbent polymer 110 in the pulverizing portion 150 at predetermined values, thereby increasing the pulverization effect on the plate-shaped super absorbent polymer 110.

The temperature of the air blown into the pulverizing portion 150 through the blower 210 may be determined by those skilled in the art based on the standard (e.g., thickness, basic humidity, etc.) or the feeding rate of the plate-shaped super absorbent polymer 110.

In addition, the super absorbent polymer undergoes a defined drying process during the pulverization process to achieve more efficiency in the subsequent powdering process.

FIG. 12 shows, for an example, the blower 210 disposed on the back side of the pulverizing portion 150, which is not understood to limit the scope of the present invention. Instead, the blower 210 may also be disposed at different positions, such as, on the bottom end of the pulverizing portion 150 or on the side of the inlet portion 120, on occasions.

If not shown in the figure, the shredder may further comprise an auxiliary pulverizing means, such as a meat chopper, which is used as a supplementary and additional support connected to more pulverize the super absorbent polymer discharged from the outlet portion. Using the auxiliary pulverizing means may further more enhance the pulverization efficiency of the shredder for super absorbent polymer. The auxiliary pulverizing means may comprise not only the meat chopper but also a variety of pulverizing or cutting devices conventionally used to pulverize or cut the hydrated gel polymer.

The shredder may further comprise a release agent supplying means for supplying water or a release agent for the super absorbent polymer pulverized from the pulverizing portion. The use of the release agent supplying means to supply water or a release agent by spraying or the like during the pulverization process may prevent the super absorbent polymer from sticking to the rotary blades or the fixed blades and much enhance the releasability of the super absorbent polymer. Consequently, the pulverization efficiency using the shredder may be more enhanced.

The release agent as used herein may comprise any material conventionally used in preparation of super absorbent polymers, such as, for example, polyvalent metal salts, polyhydric alcohols, or surfactants. The specified examples of the release agent are disclosed in Korean Patent Publication No. 0905853.

Hereinafter, a description will be given as to a preparation method for super absorbent polymer according to an embodiment of the present invention as follows. The preparation method for super absorbent polymer according to an embodiment of the present invention comprises: preparing a monomer composition including an aqueous ethylene-based unsaturated monomer and a polymerization initiator; feeding the monomer composition into a polymerization reactor including a conveyer belt, and applying UV radiation or heat onto the monomer composition on the conveyer belt to prepare a plate-shaped super absorbent polymer; feeding the plate-shaped super absorbent polymer into any one of the shredders for super absorbent polymer according to the above-mentioned embodiments to perform a primary pulverization; drying the pulverized super absorbent polymer; and performing a secondary pulverization of the dried super absorbent polymer.

The polymerization initiator may be selected depending on whether the polymerization method is thermal polymerization using heat supply or photo-polymerization based on UV radiation. Among the polymerization initiators, the thermal polymerization initiator may comprise at least one selected from the group consisting of persulfate-based initiator, azo-based initiator, hydrogen peroxide, or ascorbic acid. More specifically, the specified examples of the persulfate-based initiator comprise sodium persulfate ($Na_2S_2O_8$), potassium persulfate ($K_2S_2O_8$), ammonium persulfate (($NH_4$)$_2S_2O_8$), etc; the specified examples of the azo-based initiator comprise 2,2-azobis(2-amidinopropane) dihydrochloride, 2,2-azobis-(N,N-dimethylene)isobutyramidine dihydrochloride), 2-(carbamoylazo)isobutyramidine dihydrochloride, 2-(carbamoylazo)isobutylonitiril, 2,2-azobis[2-(2-imidazolin-2-yl)propane] dihydrochloride, 4,4-azobis-(4-cyanovaleric acid), etc. More various thermal initiators are, if not specifically limited to, those specified in "Principle of Polymerization (Wiley, 1981)", page 203, written by Odian.

The photo-polymerization initiator as used herein may comprise at least one selected from the group consisting of benzoin ether, dialkyl acetophenone, hydroxyl alkylketone, phenyl glyoxylate, benzyl dimethyl ketal, acyl phosphine, or •-aminoketone. More various photo-polymerization initiators are, if not specifically limited to, those specified in "UV Coatings: Basics, Recent Developments and New Application (Elsevier, 2007)", page 115, written by Reinhold Schwalm.

The aqueous ethylene-based unsaturated monomer included in the monomer composition may be any kind of monomers generally used for the preparation of super absorbent polymers without a limitation in composition. The aqueous ethylene-based unsaturated monomer largely comprises at least one selected from the group consisting of anionic monomers and their salts, nonionic hydrophile-containing monomers, or unsaturated monomers containing amino groups and their quarternary compounds.

More specifically, the aqueous ethylene-based unsaturated monomer as used herein preferably comprises at least one selected from the group consisting of anionic monomers (e.g., acrylic acid, methacrylic acid, anhydrous maleic acid, fumaric acid, crotonic acid, itacronic acid, 2-acryloyl ethane sulfonic acid, 2-methacryloyl ethane sulfonic acid, 2-(meta) acryloyl propane sulfonic acid, or 2-(meta)acrylamide-2-methyl propane sulfonic acid) and their salts; nonionic hydrophile-containing monomers (e.g., (meta)acrylamide, N-substituted(meta)acrylate, 2-hydroxyethyl(meta)acrylate, 2-hydroxypropyl(meta)acrylate, methoxypolyethylene glycol(meta)acrylate, or polyethylene glycol(meta)acrylate); or unsaturated monomers containing amino groups (e.g., (N,N)-dimethylaminoethyl(meta)acrylate, or (N,N)-dimethylaminopropyl(meta)acrylamide) and their quarternary compounds.

More preferably, acrylic acid or its salt may be used as a monomer, which ends up with a super absorbent polymer with enhanced absorptive property. In the monomer composition, the aqueous ethylene-based unsaturated monomer and the polymerization initiator are used in a generally acceptable content range without any limitation in their composition.

The monomer composition thus prepared is transferred to a polymerization reactor including a conveyer belt and exposed to UV radiation or heat to yield a plate-shaped super absorbent polymer.

The plate-shaped super absorbent polymer is as defined above, and has a moisture content of 30 to 60%, appropriately 35 to 55%. The plate-shaped super absorbent polymer thus prepared is fed into any one of the shredders for super absorbent polymer according to the above-described embodiments of the present invention for a primary pulverization. The use of the shredder secures more efficiency in the primary pulverization process even for the plate-shaped super absorbent polymer having a relatively high moisture content, as a result of which the plate-shaped super absorbent polymer can be more uniformly pulverized and cut into smaller crumbs to increase the surface area. Consequently, the subsequent drying process is performed with more efficiency to enhance the property of the final super absorbent polymer, such as water retention capacity. To the contrary, the use of another shredder that has, for example, rotary blades with vertices lifted at an angle greater than 45° can hardly achieve the benefits of the present invention, eventually with a deterioration in the property of the final super absorbent polymer.

If not specifically limited, the primary pulverization step is performed to achieve the particle diameter of pulverized super absorbent polymer in the range of 1 to 50 mm, preferably 2 to 20 mm, more preferably 3 to 15 mm. Preferably, a simple drying step may be carried out prior to the primary pulverization step in order to more enhance the pulverization efficiency. The energy source used in the drying step may comprise, but not limited to, hot air or UV radiation.

The super absorbent polymer after the primary pulverization step may undergo a drying step, which is carried out until the moisture content of the dried super absorbent polymer is less than 10 wt. %. The drying step may be followed by a secondary pulverization step at last. The shredder used in the secondary pulverization step may comprise, but is not specifically limited to, any kind of shredders generally used for powdering particles. More specifically, such a shredder may comprise pin mill, hammer mill, screw mill, roll mill, disc mill, or jog mill. Preferably, the secondary pulverization step is performed until the particle diameter of the pulverized super absorbent polymer reaches 150 to 180 μm.

EXAMPLES

Hereinafter, the present invention will be described in further detail with reference to the following examples, which are presented as exemplary only and not intended to limit the scope of the present invention.

Example 1

Preparation of Super Absorbent Polymer 100 g of acrylic acid, 0.1 g of polyethylene glycol diacrylate as an internal cross-linking agent, 38.9 g of sodium hydroxide (NaOH) and 103.9 g of water were mixed together to prepare a monomer composition containing 50 wt. % of the monomer.

The monomer composition thus obtained was transferred to a moving conveyer belt through a monomer feeding portion and then mixed with 10 g of a 3% aqueous solution of sodium persulfate used as a polymerization initiator.

Polymerization reaction was initiated one minute after addition of the polymerization initiator and continued for four minutes. The internal temperature of the reactor was 99° C.

Figure 13A:
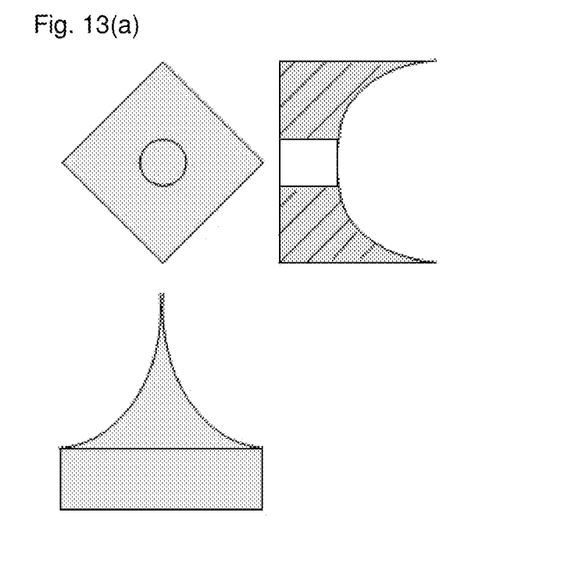
FIGS. 13(a) to 13(f) present views of the rotary blades used in the Examples 1 to 3 and the Comparative Examples 1 to 3.

The plate-shaped super absorbent polymer thus prepared was transferred to a primary shredder for super absorbent polymer and pulverized into particles with a particle diameter of 5 mm. Here, the moisture content of the plate-shaped super absorbent polymer was 36%. The primary shredder was the equipment shown in FIG. 1 with rotary blades in the shape of a rectangle as depicted in FIG. 13(a), which had two vertices lifted at an acute angle of 25°.

Subsequently, the super absorbent polymer discharged from the primary shredder was dried out in a hot air drier at 180° C. for one hour. The dried super absorbent polymer had a moisture content of 1.6%. The dry super absorbent polymer was pulverized with a pin mill and then subjected to sieve separation to sort out super absorbent polymer particles with a particle diameter of 150 to 850 µm.

Example 2

Preparation of Super Absorbent Polymer

Figure 13B:
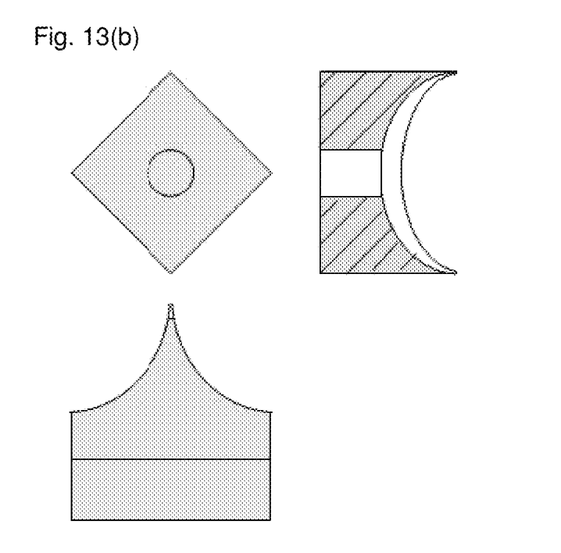

The procedures were performed in the same manner as described in Example 1 to prepare a plate-shaped super absorbent polymer. The plate-shaped super absorbent polymer thus prepared was transferred to a primary shredder for super absorbent polymer and pulverized into particles with a particle diameter of 10 mm. The moisture content of the plate-shaped super absorbent polymer was 36%. The primary shredder was the equipment shown in FIG. 1 with rotary blades in the shape of a rectangle as depicted in FIG. 13(b), which had two vertices lifted at an acute angle of 30°.

Subsequently, the super absorbent polymer discharged from the primary shredder was dried out in a hot air drier at 180° C. for one hour. The dried super absorbent polymer had a moisture content of 1.7%. The dry super absorbent polymer was pulverized with a pin mill and then subjected to sieve separation to sort out super absorbent polymer particles having a particle diameter of 150 to 850 µm.

Example 3

Preparation of Super Absorbent Polymer

Figure 13C:
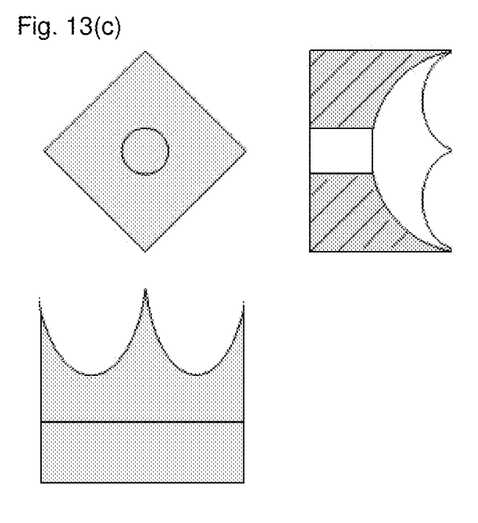

The procedures were performed in the same manner as described in Example 1 to prepare a plate-shaped super absorbent polymer. The plate-shaped super absorbent polymer thus prepared was transferred to a primary shredder for super absorbent polymer and pulverized into particles with a particle diameter of 15 mm. The moisture content of the plate-shaped super absorbent polymer was 37%. The primary shredder was the equipment shown in FIG. 1 with rotary blades in the shape of a rectangle as depicted in FIG. 13(c), which had four vertices lifted at an acute angle of 35°.

Subsequently, the super absorbent polymer discharged from the primary shredder was dried out in a hot air drier at 180° C. for one hour. The dried super absorbent polymer had a moisture content of 1.8%. The dry super absorbent polymer was pulverized with a pin mill and then subjected to sieve separation to sort out super absorbent polymer particles having a particle diameter of 150 to 850 µm.

Comparative Example 1

Preparation of Super Absorbent Polymer

Figure 13D:
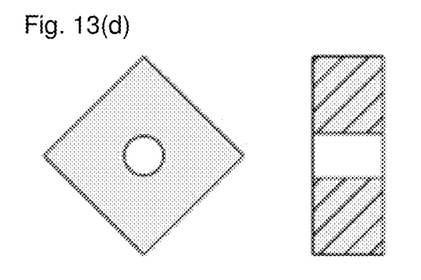

The procedures were performed in the same manner as described in Example 1 to prepare a plate-shaped super absorbent polymer. The plate-shaped super absorbent polymer thus prepared was transferred to a primary shredder for super absorbent polymer and pulverized into particles with a particle diameter of 40 mm. The moisture content of the plate-shaped super absorbent polymer was 39%. The primary shredder was the equipment shown in FIG. 1 with rotary blades formed in the shape of a rectangle as depicted in FIG. 13(d), which had no vertex lifted at all.

Subsequently, the super absorbent polymer discharged from the primary shredder was dried out in a hot air drier at 180° C. for one hour. The dried super absorbent polymer had a moisture content of 2.0%. The dry super absorbent polymer was pulverized with a pin mill and then subjected to sieve separation to sort out super absorbent polymer particles having a particle diameter of 150 to 850 µm.

Comparative Example 2

Preparation of Super Absorbent Polymer

Figure 13E:
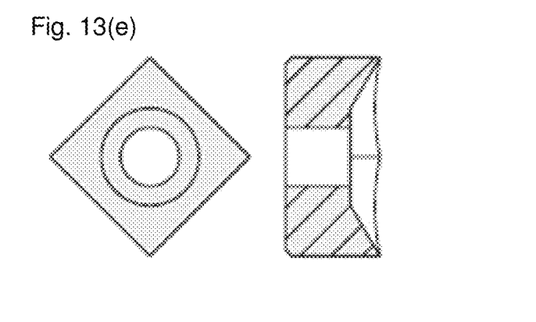

The procedures were performed in the same manner as described in Example 1 to prepare a plate-shaped super absorbent polymer. The plate-shaped super absorbent polymer thus prepared was transferred to a primary shredder for super absorbent polymer and pulverized into particles with a particle diameter of 30 mm. The moisture content of the plate-shaped super absorbent polymer was 39%. The primary shredder was the equipment shown in FIG. 1 with rotary blades in the shape of a rectangle as depicted in FIG. 13(e), which had four vertices lifted at an angle of 60°.

Subsequently, the super absorbent polymer discharged from the primary shredder was dried out in a hot air drier at 180° C. for one hour. The dried super absorbent polymer had a moisture content of 2.0%. The dry super absorbent polymer was pulverized with a pin mill and then subjected to sieve separation to sort out super absorbent polymer particles having a particle diameter of 150 to 850 µm.

Comparative Example 3

Preparation of Super Absorbent Polymer

Figure 13F:
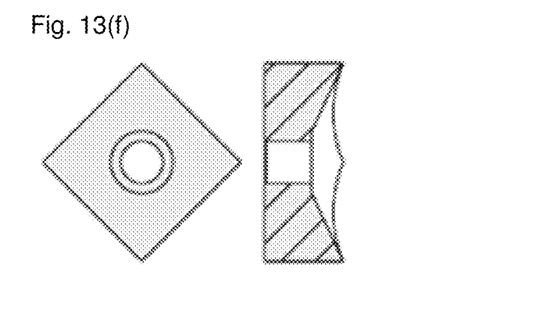

The procedures were performed in the same manner as described in Example 1 to prepare a plate-shaped super absorbent polymer. The plate-shaped super absorbent polymer thus prepared was transferred to a primary shredder for super absorbent polymer and pulverized into particles with a particle diameter of 25 mm. The moisture content of the plate-shaped super absorbent polymer was 38%. The primary shredder was the equipment shown in FIG. 1 with rotary blades in the shape of a rectangle as depicted in FIG. 13(f), which had four vertices lifted at an angle of 55°.

Subsequently, the super absorbent polymer discharged from the primary shredder was dried out in a hot air drier at 180° C. for one hour. The dried super absorbent polymer had a moisture content of 1.9%. The dry super absorbent polymer was pulverized with a pin mill and then subjected to sieve separation to sort out super absorbent polymer particles having a particle diameter of 150 to 850 µm.

Experiment Examples

Evaluation of Properties of Super Absorbent Polymer

Experiment Example 1

Water Retention Capacity

The super absorbent polymer particles prepared in the above-described method were measured in regard to water retention capacity as follows. The measurement of water retention capacity was performed according to EDANA standard test WSP 241.2. 0.2 g of the sample sorted out through 30-50 mesh screen was put in a tea bag, which was soaked in a 0.9% NaCl solution for 30 minutes, removed of water in a centrifugal separator (centrifugal force: 250 G), and then weighed to measure the amount of water retained by the super absorbent polymer that is defined as "water retention capacity".

Experiment Example 2

Content of Water-Soluble Constituents

The super absorbent polymer particles prepared in the above-described method were measured in regard to the content of water-soluble constituents as follows. The measurement of the content of water-soluble constituents was performed according to EDANA standard test WSP 270.2. 1.0 g of the sample sorted out through 30-50 mesh screen was put in 200 g of a 0.9% NaCl solution, soaked for 16 hours with agitation at 500 rpm, and separated through a filter paper. The filtrate was titrated with a 0.1N NaOH solution until the desired pH 10.0 was achieved. Then a back titration was carried with a 0.1N HCl solution until the desired pH 2.7 was achieved, to calculate the content of water-soluble constituents as given by the amount of the polymer not cross-linked from the used amount for neutralization.

The properties of the super absorbent polymers of Examples 1, 2 and 3 and Comparative Examples 1, 2 and 3 as measured in the above methods are summarized in Table 1.

TABLE 1

|  | Vertex Angle of Rotary Blade (°) | Water Retention Capacity (g/g) | Content of Water-Soluble Constituents (wt. %) |
| --- | --- | --- | --- |
| Example 1 | 25 | 49 | 15.0 |
| Example 2 | 30 | 47 | 15.2 |
| Example 3 | 35 | 46.3 | 15.3 |
| Comparative Example 1 | 90 | 34 | 14.2 |
| Comparative Example 2 | 60 | 38 | 14.6 |
| Comparative Example 3 | 55 | 41 | 15.4 |

The experimental results revealed that the super absorbent polymers prepared in Examples 1, 2 and 3 maintained an equivalent content of water-soluble constituents with respect to those of Comparative Examples 1, 2 and 3 but exhibited a considerably superior water retention capacity and hence very excellent properties on the whole.

The reason of these results lies in that the shape of the rotary blades provided in the primary shredder is particularly designed to have different angles of the vertices used to tear off and cut the super absorbent polymer, which consequently secures more efficiency of the primary pulverization step to increase the surface area of the pulverized super absorbent polymer after the primary pulverization process and thereby achieves more drying efficiency even using the same drying process.

The invention claimed is:

1. A shredder for super absorbent polymer, comprising:
an inlet portion for feeding a plate-shaped super absorbent polymer;
a pulverizing portion for pulverizing the super absorbent polymer fed through the inlet portion; and
an outlet portion for discharging the pulverized super absorbent polymer from the pulverizing portion,
wherein the pulverizing portion comprises:
a rotary drum having a plurality of rotary blades attached thereto;
at least one fixed blade for pulverizing the super absorbent polymer in cooperation with the rotary blades; and
a housing for holding the rotary drum and the at least one fixed blade mounted therein,
wherein the rotary blades have a shape of polygon with at least one vertex lifted from a concave face of the rotary blade, and having an acute angle of 25° to 35°, and
wherein the shredder is used to pulverize the polymerized plate-shaped super absorbent polymer.

2. The shredder for super absorbent polymer as claimed in claim 1, wherein the rotary drum has rotary blade mounting grooves arranged in circumferential direction,
the rotary blades being rested in the mounting grooves to expose the at least one vertex thereof lifted on the drum.

3. The shredder for super absorbent polymer as claimed in claim 2, wherein the rotary blade mounting groove has a rotary blade mounting jig fixed thereon,
each rotary blade being fixedly bolted to the rotary blade mounting jig.

4. The shredder for super absorbent polymer as claimed in claim 1, wherein each rotary blade has a plurality of vertices of the polygonal shape lifted to have an acute angle of at most 25° to 35°.

5. The shredder for super absorbent polymer as claimed in claim 1, wherein each rotary blade has a concave face in the direction of lifting the at least one vertex, the concave face having edges with an acute angle.

6. The shredder for super absorbent polymer as claimed in claim 5, wherein each edge of the face in the direction of lifting the at least one vertex connects the respective vertices of the polygonal shape in the form of a curved line.

7. The shredder for super absorbent polymer as claimed in claim 1, wherein the plural rotary blades are arranged in the form of at least one spiral on the rotary drum.

8. The shredder for super absorbent polymer as claimed in claim 1, wherein the plural rotary blades are linearly arranged in at least one row in the axial direction of the rotary drum.

9. The shredder for super absorbent polymer as claimed in claim 1, wherein the at least one fixed blade has a plurality of sawteeth.

10. The shredder for super absorbent polymer as claimed in claim 1, wherein the at least one fixed blade is provided as a plurality of fixed blades.

11. The shredder for super absorbent polymer as claimed in claim 10, wherein the at least one fixed blade is provided as a plurality of fixed blades arranged in the rotation direction of the rotary drum.

12. The shredder for super absorbent polymer as claimed in claim 1, further comprising:
a blower for blowing air of a predetermined temperature into the pulverizing portion; and
an outlet passage for discharging the air from the pulverizing portion.

* * * * *